(12) United States Patent
Reddy et al.

(10) Patent No.: US 10,375,150 B2
(45) Date of Patent: Aug. 6, 2019

(54) CROWD-BASED DEVICE TRUST ESTABLISHMENT IN A CONNECTED ENVIRONMENT

(71) Applicant: Google LLC, Mountain View, CA (US)

(72) Inventors: Prashant Papiahgari Reddy, Madison, NJ (US); Mark Rajan Malhotra, San Mateo, CA (US)

(73) Assignee: Google LLC, Mountain View, CA (US)

(*) Notice: Subject to any disclaimer, the term of this patent is extended or adjusted under 35 U.S.C. 154(b) by 704 days.

(21) Appl. No.: 14/858,708

(22) Filed: Sep. 18, 2015

(65) Prior Publication Data

US 2017/0082987 A1   Mar. 23, 2017

(51) Int. Cl.
*H04L 29/08* (2006.01)
*H04L 12/28* (2006.01)
*H04L 29/06* (2006.01)

(52) U.S. Cl.
CPC .......... *H04L 67/10* (2013.01); *H04L 12/2823* (2013.01); *H04L 63/00* (2013.01); *H04L 63/1408* (2013.01); *H04L 67/12* (2013.01)

(58) Field of Classification Search
CPC .......... H02J 3/32; H02J 3/382; H02J 13/0006; H02J 7/0068; G05F 1/66; H04L 12/2803
See application file for complete search history.

(56) References Cited

U.S. PATENT DOCUMENTS

| | | |
|---|---|---|
| 9,299,029 B1 | 3/2016 | Kim |
| 2013/0318217 A1* | 11/2013 | Imes ...................... G05B 15/02 709/221 |
| 2014/0129599 A1* | 5/2014 | Boccon-Gibod ........................... G06F 17/30867 707/827 |
| 2015/0066228 A1* | 3/2015 | Clifton ..................... H02J 3/32 700/295 |

* cited by examiner

*Primary Examiner* — Philip J Chea
*Assistant Examiner* — Mohammed Ahmed
(74) *Attorney, Agent, or Firm* — Kilpatrick Townsend & Stockton LLP

(57) ABSTRACT

An electronic device may that communicates with a plurality of electronic devices may include a network interface and a processor. The network interface may receive a first set of data from a first electronic device and a second set of data from a second electronic device. The processor may then determine a first trust value for the first set of data based on a first corroboration of the first set of data using the second set of data. The first corroboration may include using the second set of data to verify the first set of data.

18 Claims, 8 Drawing Sheets

CROWD-BASED DEVICE TRUST ESTABLISHMENT IN A CONNECTED ENVIRONMENT

BACKGROUND

The present disclosure relates generally to sharing data between various devices in a connected environment, such as a smart home environment. More specifically, the present disclosure relates generally to learning confidence or associating trust with data being provided by various devices that communicate with devices within the connected environment.

Numerous electronic devices that are part of a smart home environment are now capable of communicating with other devices that are typically used outside the smart home environment. Although each of these devices may collect different types of information and perform different functions, it may be useful to share this information collected by each respective device with each other, such that each device may better perform its respective operations. Simply sharing indiscriminately, however, may not adequately protect private data or could lead to asymmetric or unfair data sharing by some devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain examples disclosed herein is set forth below. It should be understood that these aspects are presented merely to provide the reader with a brief summary of these certain examples and that these aspects are not intended to limit the scope of this disclosure. Indeed, this disclosure may encompass a variety of aspects that may not be set forth below.

In one example, a cloud-computing device may monitor one or more properties of a home environment. The cloud-computing device may receive a first set of data acquired from a first electronic device that monitors at least one of the properties of the home environment and receive a second set of data acquired from a second set of data acquired from a second electronic device that monitors the at least one of the properties of the home environment. The cloud-computing device may then determine a first trust value associated with the first set of data based on a first corroboration of the first set of data and the second set of data. The first corroboration may involve using the second set of data to verify the first set of data.

In another example, an electronic device may that communicates with a plurality of electronic devices may include a network interface and a processor. The network interface may receive a first set of data from a first electronic device and a second set of data from a second electronic device. The processor may then determine a first trust value for the first set of data based on a first corroboration of the first set of data using the second set of data. The first corroboration may include using the second set of data to verify the first set of data.

In yet another example, a method may include receiving, via a processor, a first set of data from a first electronic device and receiving, via the processor, a second set of data from a second electronic device. The method may then include determining a first trust value for the first set of data based on a first corroboration of the first set of data with respect to the second set of data. The method may then generate a modified first set of data based on the first set of data when the first trust value is below a threshold and send a command to an actuator based on the modified first set of data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated examples may be incorporated into any of the above-described aspects of the present disclosure alone or in any combination. The brief summary presented above is intended only to familiarize the reader with certain aspects and contexts of examples of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
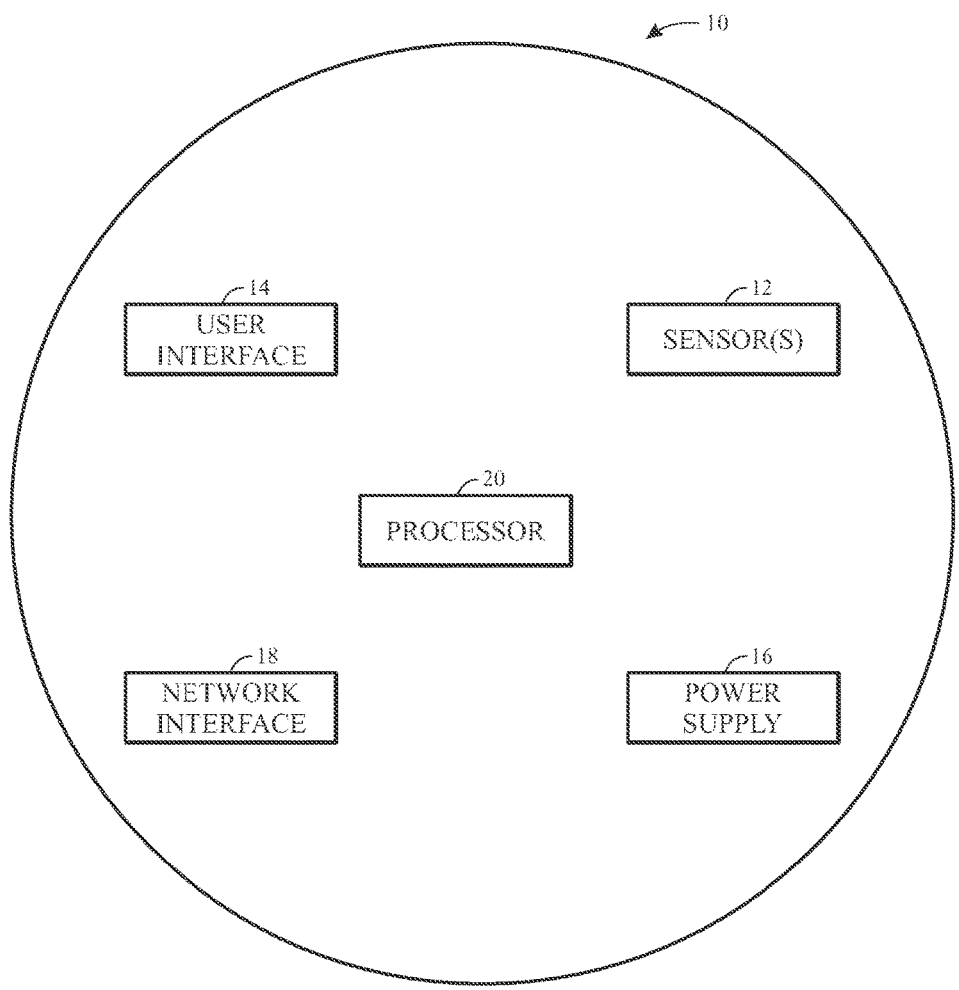
FIG. 1 illustrates a block diagram of a general device that may control and/or monitor a building environment, in accordance with an example.

One or more specific examples of the present disclosure will be described below. These described examples are only examples of the presently disclosed techniques. Additionally, in an effort to provide a concise description of these examples, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various examples of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features.

Examples disclosed herein relate to establishing a trust level or value with respect to data determined or calculated by a particular device or with data received by a third-party device. Generally, in a smart home environment, a number of devices may acquire various types of data via sensors and make certain determinations according to the acquired data. For example, a thermostat device may include an infrared sensor that may determine whether a human currently occupies the home or not. Based on this information, the thermostat device may adjust a temperature of the smart home environment to accommodate for the presence of the human or the absence of the human. Since the thermostat device relies on data acquired by its own sensors, the thermostat device may associate or presume a high degree of trust regarding its determination of the smart home environment being occupied by a human.

As devices in the smart home environment become more prevalent, other devices outside the smart home environment may wish to communicate with smart home devices to learn more about the user of the smart home environment. In the same manner, the smart home devices may benefit from data acquired from these other devices to learn more about the user. As such, in certain examples, these third-party devices or devices that are not part of the smart home environment may share data with the smart home devices. However, the smart home devices may not initially trust the data received from these third-party devices, as compared to the data it acquired via its own sensors or via its own determination. That is, since the smart home devices and the third-party devices may be manufactured by different entities, it is unlikely that the different entities acquire data in a similar manner, make data determinations in a similar manner, associate trust values in a similar manner, or the like.

Although the smart home devices may not trust the data provided by these third-party devices, some of the data acquired by the smart home devices may be used to corroborate or verify the data received from or determined by these third-party devices. In the same manner, the smart home devices may use the data acquired by the third-party devices to corroborate or verify its own determinations. As data is corroborated using data acquired by other devices, the smart home devices may adjust a trust level associated with the third-party device providing the data, with data provided by the third-party device, data determinations made by the smart home environment, or the like.

By using data acquired by third-party devices to corroborate other types of data, smart home devices may better predict the behavior of a homeowner or user of a smart device, and thus better accommodate the smart home environment for the user. Moreover, by regularly corroborating data acquired by third-party devices, the smart home devices may establish a trust levels for devices manufactured by various vendors, data provided by the third-party devices, and the like. Using these trust levels, the smart home devices may adjust the smart home environment to better accommodate the preferences of the homeowner.

Smart Device in Smart Home Environment

By way of introduction, FIG. 1 illustrates an example of a general device 10 that may that may be disposed within a building environment. In one example, the device 10 may include one or more sensors 12, a user-interface component 14, a power supply 16 (e.g., including a power connection and/or battery), a network interface 18, a processor 20, and the like.

The sensors 12, in certain examples, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an example with a single sensor, many examples may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain examples, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface components 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one example, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another example, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices, servers, routers, and the like. As such, the network interface 18 may enable the device 10 to communicate with other devices 10 or communication-capable components via a wired or wireless network. The network interface 18 may include a wireless card or some other transceiver connection to facilitate this communication. In any case, the network interface 18 may be capable of communicating with a cloud-computing system that may receive data from a variety of different types of devices 10, each of which may communicate using a different communication protocol. The network interface 18 may include a receiving component and a transmitting component capable of receiving data and transmitting data respectively. In certain examples, the network interface 18 may activate the receiving component and/or the transmitting component based on instructions from the processor 20. The data being received or transmitted by the network interface 18 may correspond to any number of formats such that it may be communicated via a wired or wireless manner. As will be appreciated, the network interface 18 may enable devices to communicate with each other based on a communication schedule, as will be discussed in greater detail below.

The processor 20 may support one or more of a variety of different device functionalities. As such, the processor 20 may include one or more processors configured and programmed to carry out and/or cause to be carried out one or more of the functionalities described herein. In one example, the processor 20 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. In certain examples, the processor 20 may execute operations such as operating the user-interface component 14 and the like, as well as detecting a hazard or temperature from the sensor 12.

In some instances, devices may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

Figure 2:
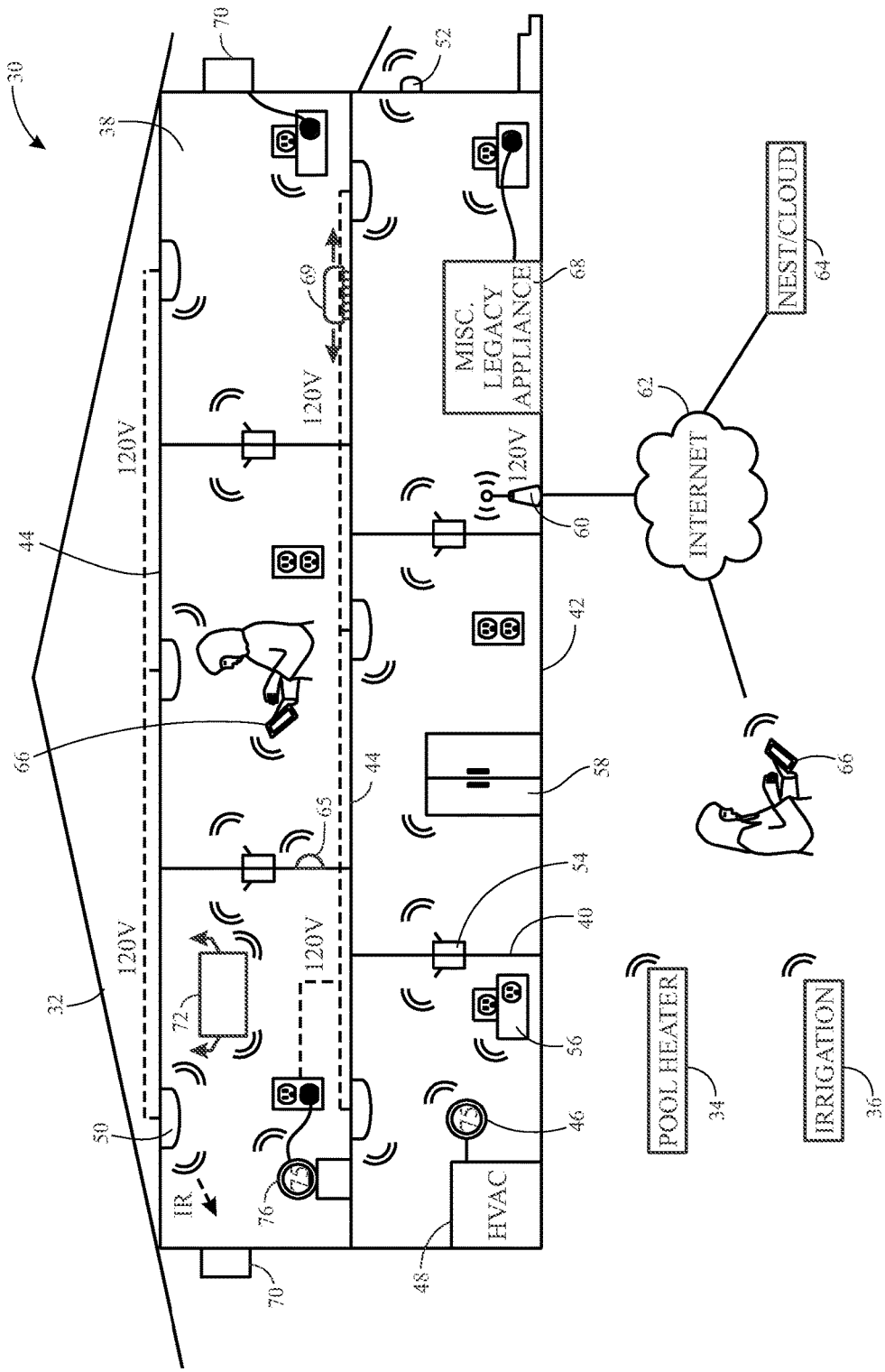
FIG. 2 illustrates a block diagram of a smart-home environment in which the general device of FIG. 1 may communicate with other devices via a network layer protocol, in accordance with an example.

Keeping the foregoing in mind, FIG. 2 illustrates an example of a smart-home environment 30 within which one or more of the devices 10 of FIG. 1, methods, systems, services, and/or computer program products described further herein can be applicable. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment 30 can control and/or be coupled to devices outside of the actual structure 32. Indeed, several devices in the smart home environment 30 need not physically be within the structure 32 at all. For example, a device controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42 or ceiling 44.

In some examples, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"). According to examples, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensors 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-home environment 30.

In some examples, the smart-home environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some examples, the device 10 within the smart-home environment 30 may further includes a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to examples, the network-connected appliances 58 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to examples, the smart thermostats 46, the smart hazard detectors 50, the smart doorbells 52, the smart wall switches 54, the smart wall plugs 56, and other devices of the smart-home environment 30 are modular and can be incorporated into older and new houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some examples, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to examples, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices outside of the physical home but within a proximate geographical range of the home. For example, the smart-home environment 30 may include a pool heater monitor 34 that communicates a current pool temperature to other devices within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to examples, an algorithm is provided for considering the geographic location of the smart-home environment 30, such as based on the zip code or geographic coordinates of the home. The geographic information is then used to obtain data helpful for determining optimal times for watering, such data may include sun location information, temperature, dew point, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current set point temperature for a device and adjust it using a computer. The user can be in the structure during this remote communication or outside the structure.

As discussed, users can control the smart thermostat and other smart devices in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment "learns" who is an occupant and permits the devices 66 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to examples, a guest-layer of controls can be provided to guests of the smart-home environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the homeowner's login credentials, etc., and therefore cannot remotely control the thermostat via such an application. Accordingly, according to examples described herein, the guest can open a mobile browser on their mobile device, type a keyword, such as "NEST" into the URL field and tap "Go" or "Search", etc. In response, the device presents the guest with a user interface, which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to examples, to enable guests to access the user interface that provides the guest layer of controls, a local webserver is provided that is accessible in the local area network (LAN). It does not require a password, because physical presence inside the home is established reliably enough by the guest's presence on the LAN. In some examples, during installation of the smart device, such as the smart thermostat, the homeowner is asked if they want to enable a Local Web App (LWA) on the smart device. Business owners will likely say no; homeowners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to examples, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to examples, a guest layer of controls may also be provided to users by means other than a device 66. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to examples, when a guest controls the smart devices, such as the smart thermostat, the smart devices do not "learn" from the guest. This prevents the guest's adjustments and controls from affecting the learned preferences of the occupants.

According to some examples, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some examples, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some examples, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to examples, all or some of the smart devices can serve as wireless or wired repeaters. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system 64. The central server or cloud-computing system 64 can be associated with a manufacturer, support entity, or service provider associated with the device. For one example, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals). In certain examples, the cloud-computing system 64 may receive data from each of the devices within the smart-home environment 30, such that the data regarding the smart-home environment 60 may be stored remotely, analyzed, shared with certain service providers, and the like.

According to examples, the smart devices combine to create a mesh network of spokesman and low-power nodes in the smart-home environment 30, where some of the smart devices are "spokesman" nodes and others are "low-powered" nodes. Some of the smart devices in the smart-home environment 30 are battery powered, while others have a regular and reliable power source, such as by connecting to wiring (e.g., to 120V line voltage wires) behind the walls 40 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 30 as well as with the central server or cloud-computing system 64. On the other hand, the devices that are battery powered are referred to as "low-power" nodes. These nodes tend to be smaller than spokesman nodes and can only communicate using wireless protocols that require very little power, such as Zigbee, 6LoWPAN, etc. Further, some, but not all, low-power nodes are incapable of bidirectional communication. These low-power nodes send messages, but they are unable to "listen". Thus, other devices in the smart-home environment 30, such as the spokesman nodes, cannot send information to these low-power nodes.

As described, the smart devices serve as low power and spokesman nodes to create a mesh network in the smart-home environment 30. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-home environment 30 as well as over the Internet 62 to the central server or cloud-computing system 64. According to examples, the mesh network enables the central server or cloud-computing system 64 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment, as well as to other spokesman nodes that did not receive the commands directly from the central server or cloud-computing system 64.

An example of a low-power node is a smart night-light 65. In addition to housing a light source, the smart night light 65 houses an occupancy sensor, such as an ultrasonic or passive IR sensor, and an ambient light sensor, such as a photoresistor or a single-pixel sensor that measures light in the room. In some examples, the smart night-light 65 is configured to activate the light source when its ambient light sensor detects that the room is dark and when its occupancy sensor detects that someone is in the room. In other examples, the smart night-light 65 is simply configured to activate the light source when its ambient light sensor detects that the room is dark. Further, according to examples, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some examples, these low-powered and spokesman nodes (e.g., devices 46, 50, 52, 54, 56, 58, and 65) can function as "tripwires" for an alarm system in the smart-home environment. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the devices 10 may be incapable of communicating with each other. Therefore, as discussed in detail below, the present techniques provide network communication jamming attack detection and notification solutions to such a problem.

In some examples, the mesh network can be used to automatically turn on and off lights as a person transitions from room to room. For example, the low-powered and spokesman nodes detect the person's movement through the smart-home environment and communicate corresponding messages through the mesh network. Using the messages that indicate which rooms are occupied, the central server or cloud-computing system 64 or some other device activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart night-light 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to determine the person's movement and provide light as the person moves from room to room.

In some examples, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system 64 or some other device uses occupancy information obtained from the low-powered and spokesman nodes to determine which rooms are occupied and then turns on lights (e.g., nightlights 65, wall switches 54, wall plugs 56 that power lamps, etc.) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some examples, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other examples, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one example, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupancy conditions are likewise applicable for personal health-area network and personal safety-area network examples.

According to some examples, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one example relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another example relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some examples are systems and methods relating to the integration of the service robot(s) 69 with home security sensors and related functionalities of the smart home system. The examples are particularly applicable and advantageous when applied for those service robots 69 that perform "away" functionalities or that otherwise are desirable to be active when the home is unoccupied (hereinafter "away-service robots"). Included in the examples are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one example is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another example, functionality similar to that of the central server in the above example can be performed by an on-site computing device such as a dedicated server computer, a "master" home automation console or panel, or as an adjunct function of one or more of the smart-home devices of FIG. 2. In such an example, there would be no dependency on a remote service provider to provide the "away-service-OK" permission to the away-service robots and the false-alarm-avoidance filtering service or filter information for the sensed intrusion detection signals.

According to other examples, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" set point temperature). According to one example, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other examples, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some examples, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third-party data security services or certificate authorities. For some examples, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described examples that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other examples, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one example, the away-service environmental signatures for each of a plurality of known away-service robots are stored in the memory of the activity sensing systems based on empirically collected data, the environmental signatures being supplied with the activity sensing systems and periodically updated by a remote update server. For another example, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another example, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one example an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning example in which the environmental signatures of the away-service robots are automatically learned without requiring user interaction, it is more preferable that a certain number of false triggers be tolerable over the course of the learning process. Accordingly, this automatic-learning example is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to examples, technologies including the sensors of the smart devices located in the mesh network of the smart-home environment in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some examples, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to examples, the smart device in the smart-home environment 30 that happens to be closest to the occupant when the occupant falls asleep will be the device that transmits messages regarding when the occupant stopped moving, from which the central server or cloud-computing system 64 will make inferences about where and when the occupant prefers to sleep. This closest smart device will be the device that sounds the alarm to wake the occupant. In this manner, the "smart alarm clock" will follow the occupant throughout the house based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an example, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an example, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to examples, technologies including the sensors of the smart devices located throughout the smart-home environment in combination with rules-based inference engines or artificial intelligence provided at the central server or cloud-computing system 64 are used to detect or monitor the progress of Alzheimer's Disease. For example, the unique signatures of the occupants are used to follow the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to examples, the remote servers or cloud computing architectures 64 analyze the person's migration data collected by the mesh network of the smart-home environment to identify such patterns.

Figure 3:
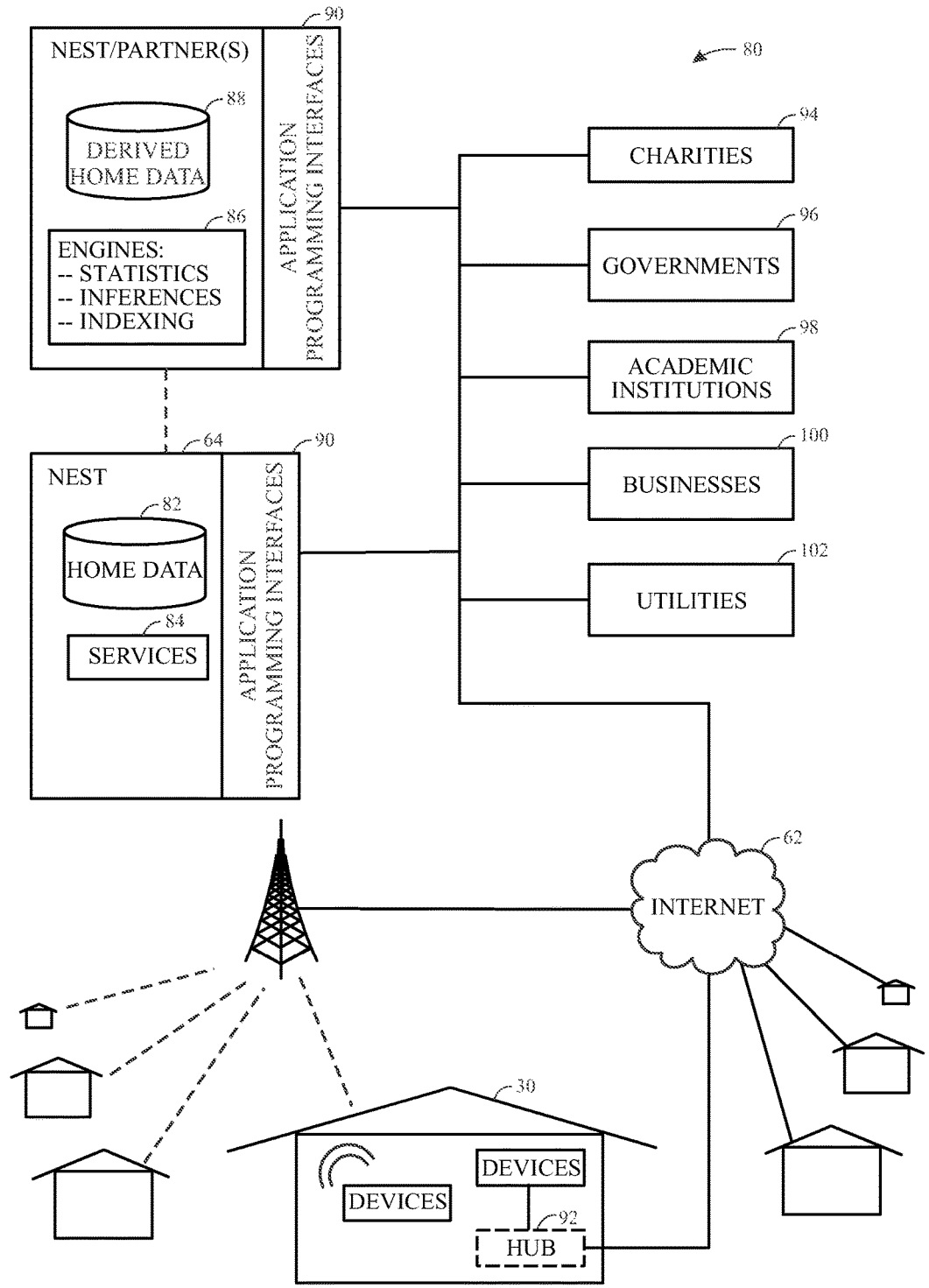
FIG. 3 illustrates a network-level view of an extensible devices and services platform with which the smart-home environment of FIG. 2 can be integrated, in accordance with an example.

In addition, FIG. 3 illustrates an example of an extensible devices and services platform 80 that can be concentrated at a single server or distributed among several different computing (e.g., cloud-computing system 64) entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some examples, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some examples, sound, vibration, and/or motion sensing components of the smart devices are used to detect sound, vibration, and/or motion created by running water. Based on the detected sound, vibration, and/or motion, the central server or cloud-computing system 64 makes inferences about water usage in the home and provides related services. For example, the central server or cloud-computing system 64 can run programs/algorithms that recognize what water sounds like and when it is running in the home. According to one example, to map the various water sources of the home, upon detecting running water, the central server or cloud-computing system 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing system 64 will know that the water usage at that time is associated with that toilet. Thus, the central server or cloud-computing system 64 can determine the water usage of that toilet as well as each water-consumption application in the home. This information can be correlated to water bills or smart water meters so as to provide users with a breakdown of their water usage.

According to some examples, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing system 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one example, the central server or cloud-computing system 64 can determine the "signatures" of particular types of pests.

For example, in the event the central server or cloud-computing system 64 detects sounds that may be associated with pests, it notifies the occupants of such sounds and suggests hiring a pest control company. If it is confirmed that pests are indeed present, the occupants input to the central server or cloud-computing system 64 confirms that its detection was correct, along with details regarding the identified pests, such as name, type, description, location, quantity, etc. This enables the central server or cloud-computing system 64 to "tune" itself for better detection and create "signatures" or "fingerprints" for specific types of pests. For example, the central server or cloud-computing system 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing system 64 can make inferences that nearby homes may also have such problems or may be susceptible to having such problems, and it can send warning messages to those homes to help facilitate early detection and prevention.

In some examples, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88. It should be noted that the APIs 90 may be limited with regard to the information provided with third-party systems or any other entity based on certain default privacy conditions, certain user-defined parameters, or the like.

For example, third parties can develop programs and/or applications, such as web or mobile apps that integrate with the central server or the cloud-computing system 64 to provide services and information to users. Such programs and application may be, for example, designed to help users reduce energy consumption, to preemptively service faulty equipment, to prepare for high service demands, to identify past service performance, etc., or to perform any of a variety of beneficial functions or tasks now known or hereinafter developed.

According to some examples, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products, services, and the like.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
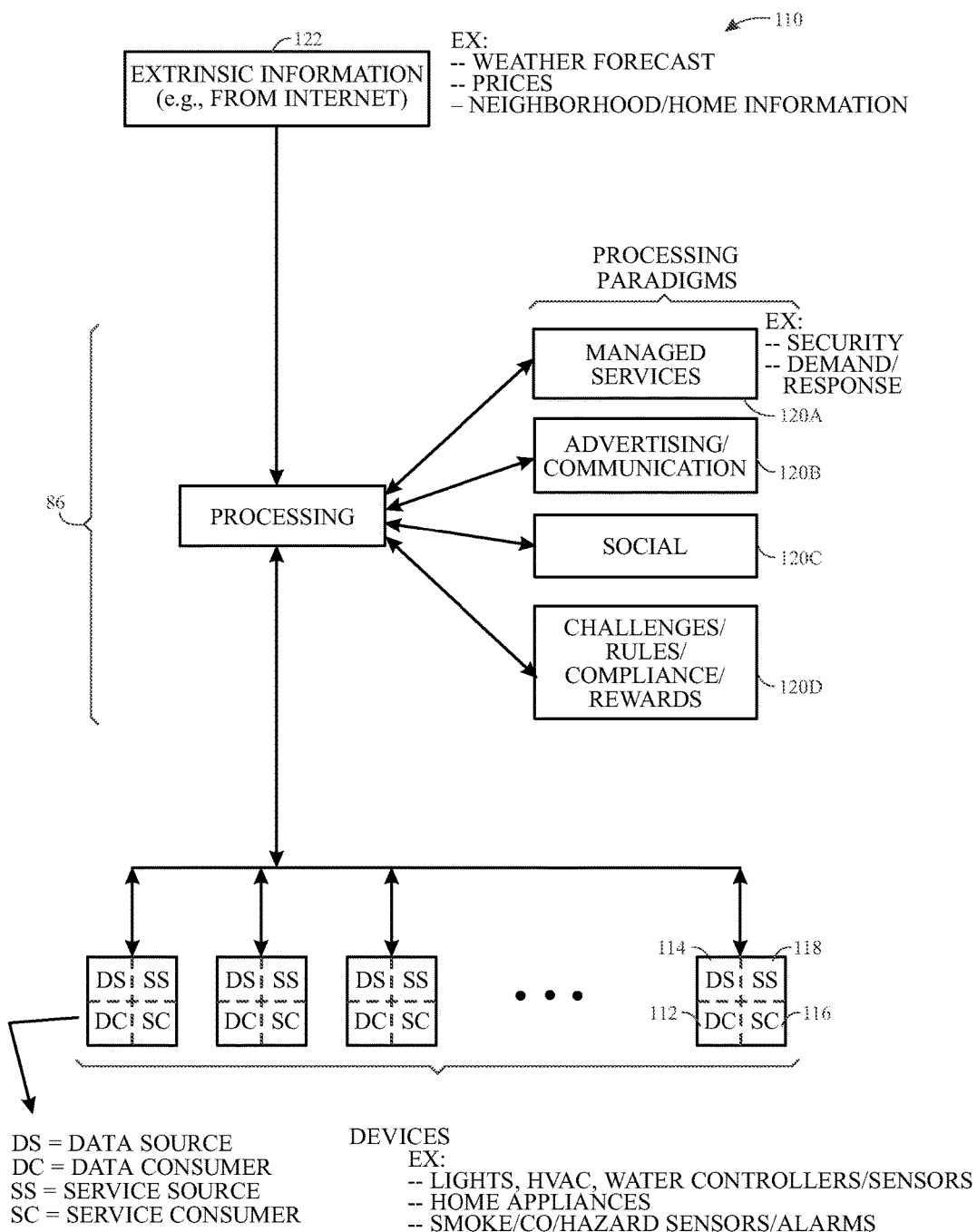
FIG. 4 illustrates an abstracted functional view of the extensible devices and services platform of FIG. 3, with reference to a processing engine as well as devices of the smart-home environment, in accordance with an example.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available.

As previously discussed, the described extensible devices and services platform 80 may enable communicating emergency information between smart-home environments 30 that are linked and/or to the proper authorities. For example, when a burglar breaks into a smart-home environment 30, a home security system may trip and sound an alarm and/or send emergency notifications to the neighbors, the police, the security company, and the like.

Crowd-Based Device Trust

Figure 5:
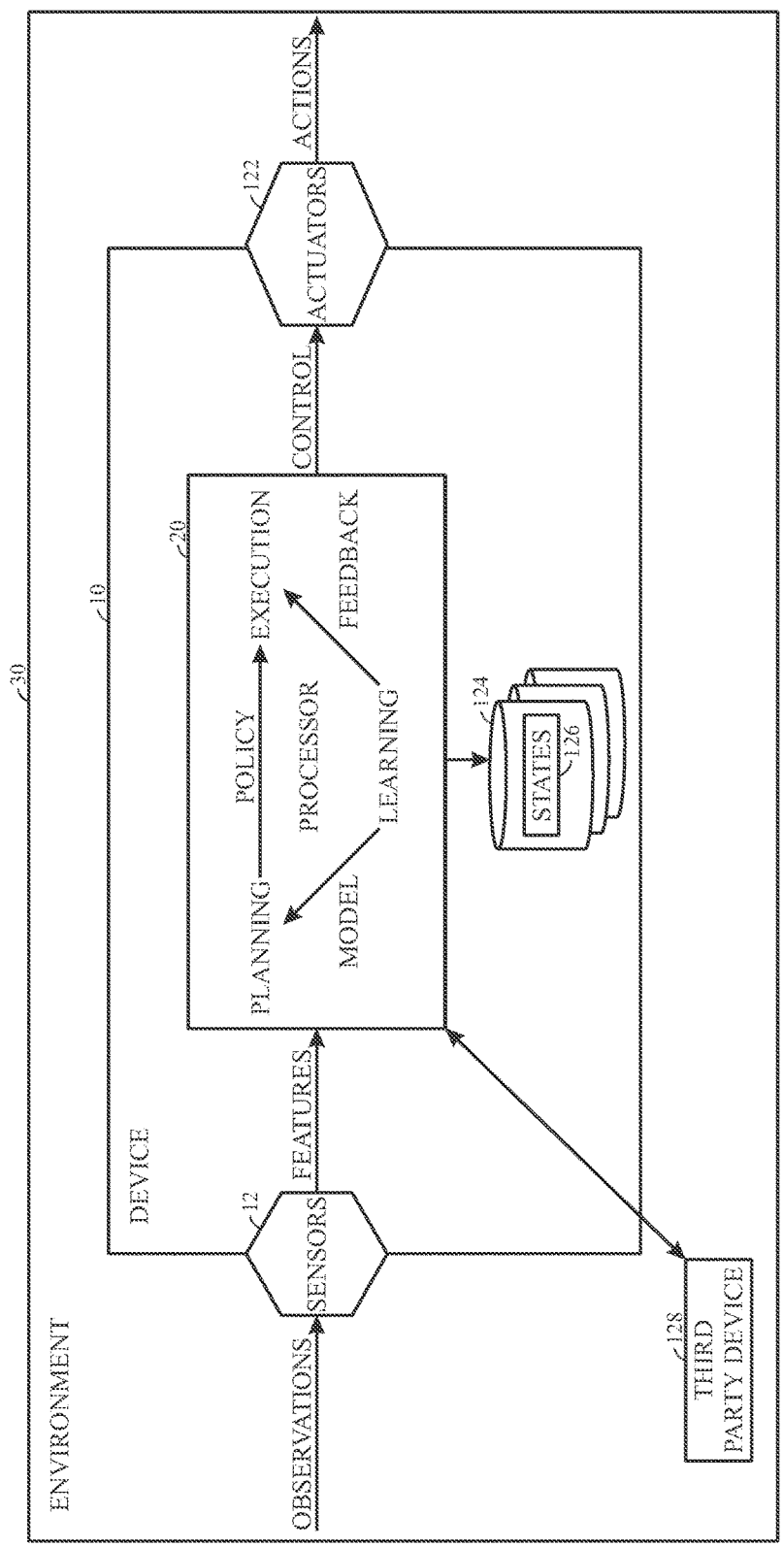
FIG. 5 illustrates a data flow chart of an example device in the smart home environment of FIG. 2, in accordance with an example.

With the foregoing in mind, FIG. 5 illustrates a general data flow chart of certain processes that may be performed by the device 10 to control certain conditions within the smart home environment 30. For instance, the device 10 may receive data or observations from the sensors 12 regarding various properties of the environment 30. The data acquired by the sensors 12 may then be received by the processor 20, which may use the data to determine how to control actuators 122. The actuators 122 may move objects (e.g., doors, windows, garage doors) based on a policy determined by the processor 20. Although the processor 20 is depicted as controlling the actuators 122, it should be noted that the processor 20 may also be used to adjust settings within the device 10, operations of the processor 20, and the like. That is, the device 10 should not be understood to be limited as controlling just the operation of the actuators 122. In certain examples, the operations capable of being performed by the device 10 may include turning on another device, downloading certain data (e.g., firmware update), sending communication (e.g., movie, music), or any activity that may be performed by the device 10.

Referring back to the processor 20, after receiving the data from the sensors 12, the processor 20 may use this feedback regarding the behavior of the user or the condition of the environment 30 to determine how to control the actuators 122. Generally, the data acquired by the sensors 12 may be compared to a model that may correspond to desired operations of a user of the device 10. The processor 20 may then plan a policy or some operation to perform based on how well the data fits with the model. The processor 20 may then execute the policy by generating commands to control the actuators 122, adjust the operations of the device 10, or the like.

In certain examples, the data received via the sensors 12 may be used to learn about the user or the environment 30. For example, the processor 20 may determine a state 126 regarding the environment, such as whether the environment is occupied by a human or not. The determined state 126 may be stored a database 124 of the device 10 as shown or may be stored in databases that may be part of another computing device (e.g., cloud computing device, local computing device). As discussed above, based on the data acquired by the sensors 12, the device 10 may associate a high degree of trust regarding the received data or the states 126 determined based on the data because the data and states are acquired or determined by the device 10 itself.

In some instances, the device 10 may receive data from other devices (e.g., third-party devices 128) that may not be manufactured by the same manufacturer of the device 10. Since the device 10 does not rely on its own components to acquire or determine this data received by the third-party devices 128, the device 10 may not attribute a high trust value with the data. However, in certain examples, the device 10 may use data that it acquires to corroborate or verify data provided by third-party devices 128. In this manner, as data is received regularly from third-party devices 128, the processor 20 of the device 10 may adjust a trust value for the third-party devices 128 based on the corroboration from its own data services.

Figure 6:
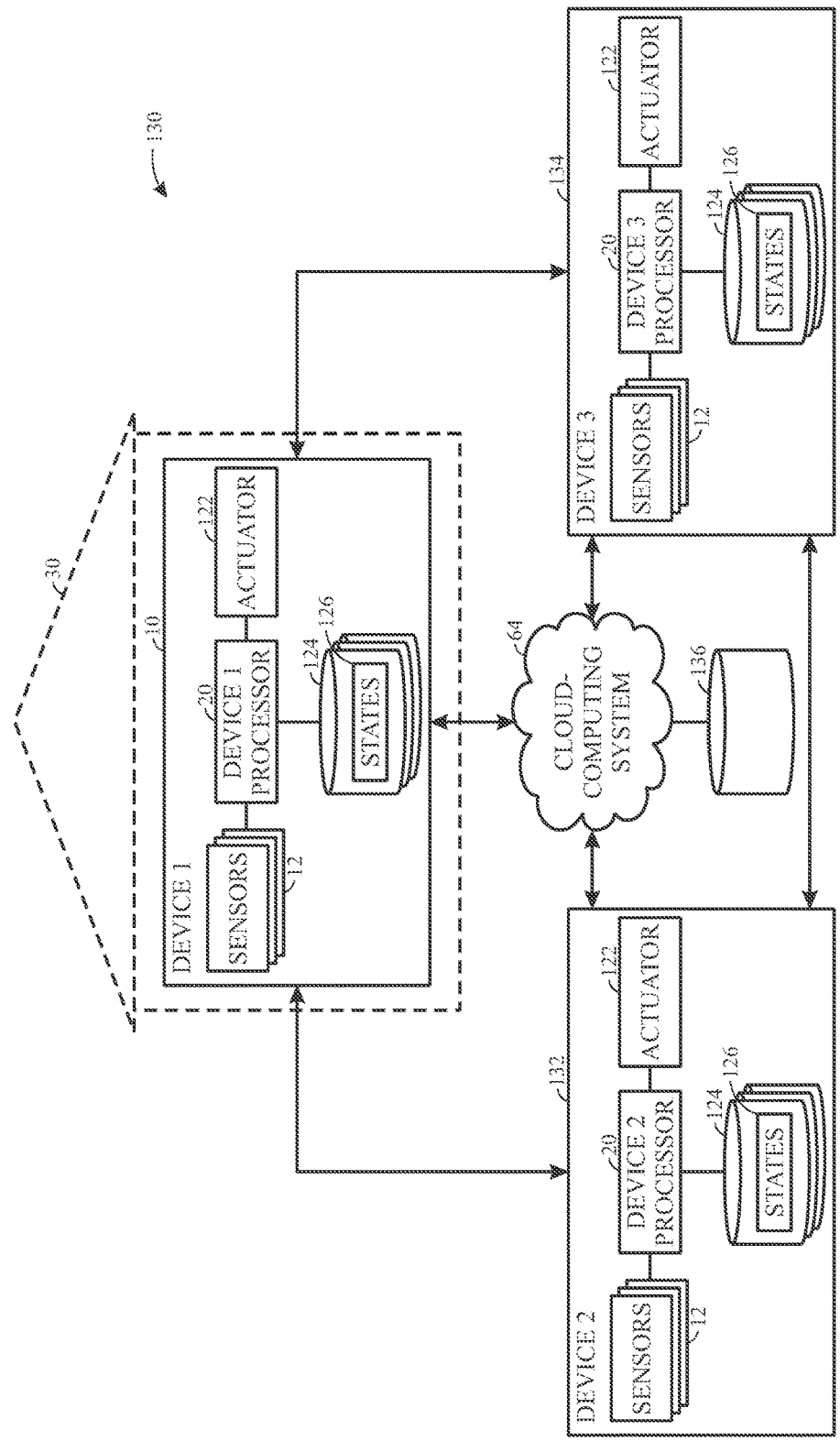
FIG. 6 illustrates a block diagram that depicts three devices communicating with each other, in accordance with an example.

With the foregoing in mind, FIG. 6 illustrates a block diagram of a communication network 130 between the device 10 that is part of the smart home environment 30 and two other third-party devices 132 and 134 that are not part of the smart home environment 30. It should be understood that the communication network 130 of FIG. 6 is provided as an example and should not be construed as being limited to three devices.

Generally, the device 10, the third-party device 132, and the third-party device 134 may each include sensors 12, processors 20, and actuators 122 as described above. Each of these third party devices 128 may communicate information or data directly with each other using a respective network interface component 18, as described above. Alternatively, each of these devices 128 may communicate with a cloud-computing system 64 as mentioned above.

In one example, the cloud-computing system 64 may transfer data between the device 10, the third-party device 132, and the third-party device 134. As such, the processor 20 of the respective device may use the received data to corroborate determinations made by the respective device. In another example, the cloud-computing system 64 may receive data from the device 10, the third-party device 132, and the third-party device 134 and perform data analysis and corroboration operations itself. In this case, the cloud-computing system 64 may store the analyzed data (e.g., state information) in a database 136, which may be locally or remotely accessible to the cloud-based computing system 64.

Regardless as to how the device 10, the third-party device 132, and the third-party device 134 communicate with each other, the data communicated between each device 10 may be used to corroborate or verify certain information and thus generate trust between each respective device. As such, trust between each device 10 may be established using a crowd-based methodology. That is, using data acquired by a number of different devices, data acquired by or determined by a particular device may be corroborated or verified. Over time, as the data acquired by or determined by the particular device is regularly corroborated, the data associated with the particular device may have an increased trust value according to other devices.

Figure 7:
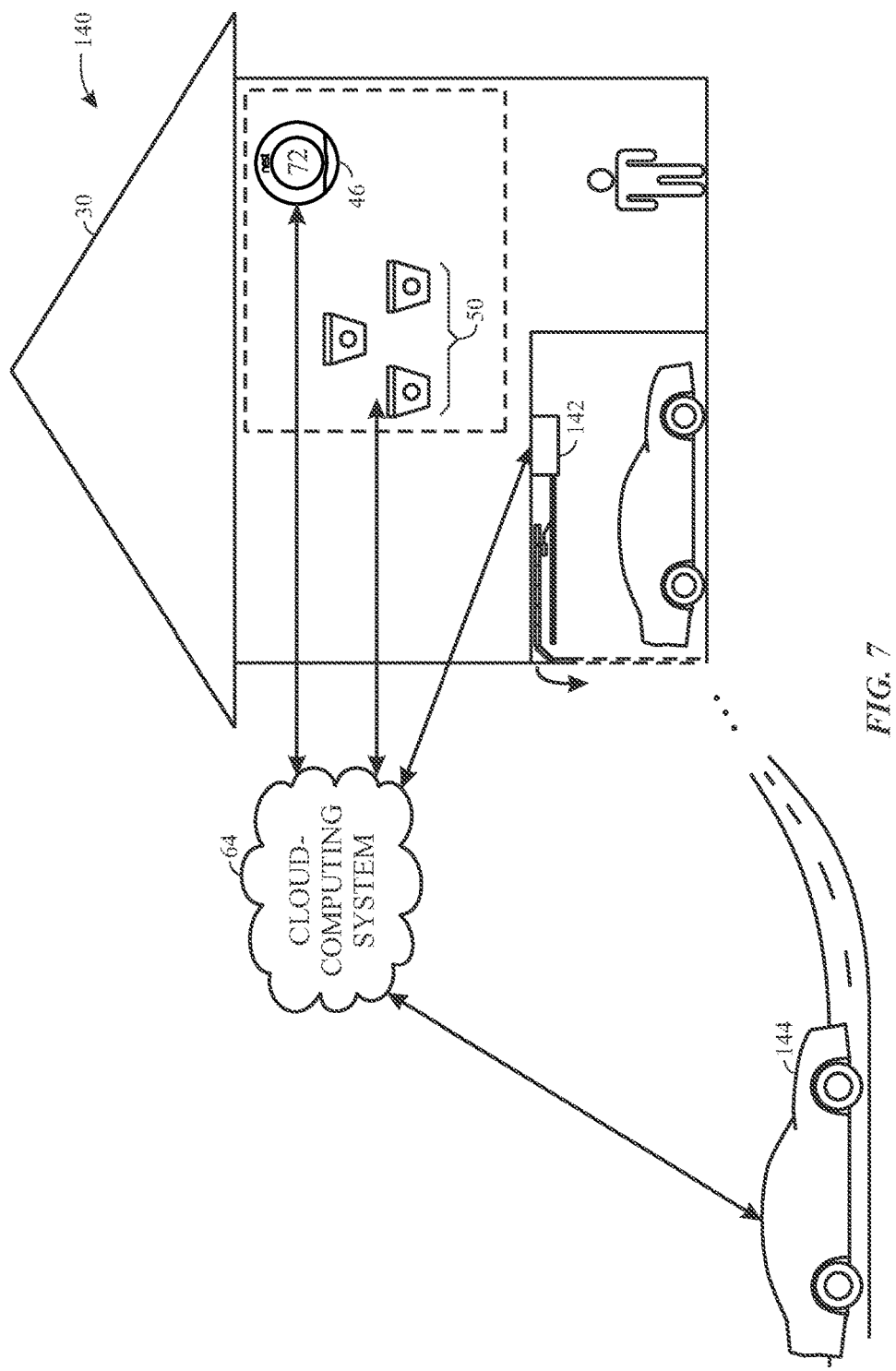
FIG. 7 illustrates a block diagram of various devices communicating with a cloud-based control system to corroborate data for devices in the smart home environment of FIG. 2, in accordance with an example.

With the foregoing in mind, FIG. 7 illustrates an example crowd-based system 140 that includes third-party devices and smart home devices that communicate with each other via the cloud-computing system 64. Referring to FIG. 7, the smart thermostat 46 and the smart hazard detector 50 may be part of the smart home environment 30. In one example, the smart thermostat 46 and the smart hazard detector 50 may be manufactured by the same entity. As such, data acquired by or determined by the smart thermostat 46 and the smart hazard detector 50 and shared between each other may be associated with a higher trust value as compared to data received from third-party devices 128.

The crowd-based system 140 may also include third-party devices, such as a smart garage door 142 and a smart car 144. The smart garage door 142 may control an operation of a garage door of a house. In certain examples, the smart garage door 142 may control the operation of the garage door or may determine an occupancy state of the smart home environment 30. For example, if the smart garage door 142 receives a signal to open the garage door and determines that an automobile has entered the home, the smart garage door 142 may determine that the smart home environment 30 is now occupied.

As mentioned above with regard to FIG. 6, the smart thermostat 46 may communicate directly with the smart garage door 142 or may communicate with each other via the cloud-computing system 64. In either case, referring to the example above, the smart garage door 142 may send data to the smart thermostat 46 indicating that the smart home environment 30 is now occupied. Upon receiving this data, the smart thermostat 46 may alter its occupancy state of the home to reflect that the home is occupied. However, in some cases, the smart thermostat 46 may not trust the data received from the smart garage door 142. As such, the smart thermostat 46 may use its sensors 12 to verify whether a human is present in the home. If the smart thermostat 46 detects the presence of a human within some time period after receiving the signal from the smart garage door 142, the smart thermostat 46 may increase a trust value associated with occupancy state information provided by the smart garage door 142. That is, since the smart thermostat 142 was able to corroborate or verify the occupancy state information received from the smart garage door 142, the smart thermostat 142 may increase a trust value associated with the occupancy state data received from the smart garage door 142.

Moreover, as the smart thermostat 46 or the smart hazard detector 50 regularly corroborates data received from the smart garage door 142, the smart thermostat 46 or the smart hazard detector 50 may incrementally increase the trust value associated with the data received from the smart door 142. Alternatively, if the smart thermostat 46 or the smart hazard detector 50 does not corroborate one or more instances regarding data provided by the smart garage door 142, the smart thermostat 46 or the smart hazard detector 50 may incrementally decrease the trust value associated with the respective data provided by the smart garage door 142.

The smart car 144 may be another third-party device that may communicate with the smart home devices, such as the smart thermostat 46 and the smart hazard detector 50. The smart car 144 may be an automobile that includes a computing system that may assist in the operation of the automobile. For example, the computing system of the smart car 144 may provide Global Positioning System (GPS) coordinates of the automobile, provide directions to a desired location, control various equipment in the vehicle, and the like. In one example, the smart car 144 may send data regarding an estimated time until arrival at the smart home environment 30 to the smart thermostat 46 via the cloud-computing system 64. It should be noted that the cloud-computing system 64 may also, or may instead, send the data regarding the estimated time until arrival of the smart car 144 based on the GPS coordinates, directions to the desired location, current operating conditions of the vehicle, and the like. In any case, the smart thermostat 46 may associate a trust value with respect to the estimated time until arrival. The trust value may be based on how previous estimate times until arrival have been corroborated with data acquired by the smart thermostat 46. For example, if the smart car 144 indicates that the estimated time until arrival at the smart home environment 30 is 30 minutes, the smart thermostat 46 may corroborate or verify this data based on detecting a presence of a human via the sensors 12 of the smart thermostat 46 or the smart hazard detectors 50.

Although the smart thermostat 46 may verify the accuracy of the estimated time until arrival provided by the smart car 144, in some instances, the data acquired by the smart thermostat 46 may not be best suited to verify the estimated time until arrival provided by the smart car 144. For example, if the thermostat 46 is located on a second floor of a home and the driver of the smart car 144 does not occupy the second floor of the home for some extended period of time after arriving at home, the occupancy data acquired by the smart thermostat 46 may not be used to accurately determine whether the estimated time until arrival provided by the smart car 144 is correct or trustworthy.

With this example in mind, the smart thermostat 46 may rely on additional information or data that may be available from other third-party devices, such as the smart garage door 142. That is, the smart thermostat 46 may use data acquired from the smart garage door 142 indicating that an automobile has entered the garage to determine whether the estimated time until arrival provided by the smart car 144 is accurate. As such, the smart thermostat 46 may determine a trust value for the estimated time until arrival provided by the smart car 144 based on data acquired by other third-party devices. In other words, the smart thermostat 46 may employ a crowd-based verification process to determine the trust value for the estimated time until arrival.

In addition to the smart car 144 and the smart garage door 142, the third-party devices may include any suitable device capable of communicating with the smart home devices. For example the third-party devices may include a dishwasher, a washing machine, a dryer, a mobile computing device (e.g., phone, tablet), a water heater, lawn care equipment (e.g., sprinklers), video monitoring devices, and the like.

Figure 8:
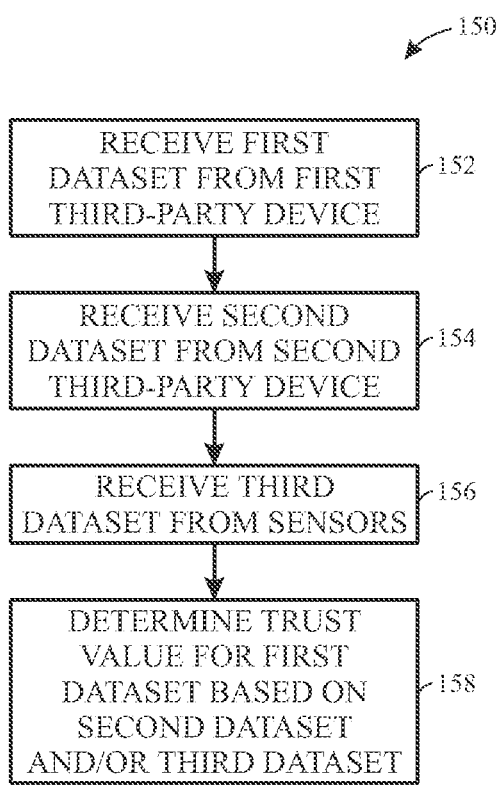
FIG. 8 illustrates a flow chart of a method employed by a device in the smart home environment of FIG. 2 for performing actions based on a trust level established using data acquired from other devices, in accordance with an example.

Regardless of the type of third-party device 128 that may communicate with the smart home devices, the smart home devices may employ a method 150 of FIG. 8 to establish a trust value for data received from the third-party devices. The following discussion of the method 150 will be described as being performed by the smart thermostat 46. However, it should be noted that the method 150 may be performed by any device in the smart home environment 30 or by the cloud-computing system 64 to establish a trust value for data received from other devices by corroborating the received data.

Referring to FIG. 8, at block 152, the smart thermostat 46 may receive a first dataset from a first third-party device 128. The first dataset may include data that may be of interest to the smart thermostat 46. Generally, the first third-party device 128 may be manufactured by a different vendor, as compared to the smart thermostat 46. As such, the smart thermostat 46 may not initially trust the data received from the first third-party device 128 or may associate the first dataset with a relatively low trust value, as compared to a trust value associated with data received via its own sensors 12. Moreover, data received via the sensors 12 may be used to establish a ground truth or a condition accepted as trustworthy.

At block 154, the smart thermostat 46 may receive a second dataset from a second third-party device 128. The second third-party device 128 may be manufactured by the same vendor as the first third-party device 128 or by a different vendor. Regardless of the vendor, the smart thermostat 46 may associate a second trust value with the second dataset.

At block 156, the smart thermostat 46 may receive a third dataset from the sensors 12 of the smart thermostat 46 or other smart home devices (e.g., smart hazard detector 50) that may be manufactured by the same vendor. As such, the smart thermostat 46 may have a higher trust value associated with the third dataset, as compared to the first and second datasets. As discussed above, the data received via the sensors 12 may be used to establish a ground truth or a condition accepted as trustworthy. In this manner, the data acquired from other smart home devices may be compared to data acquired by the sensors 12 to establish a relative trust value with respect to each other.

In any case, at block 158, the smart thermostat 46 may determine a trust value for the first dataset based on the second dataset and/or the third dataset. That is, the smart thermostat 46 may use data from other sources to corroborate the validity of the first dataset. Referring back to the example of FIG. 7, the smart thermostat 46 may verify that the estimated time until arrival (e.g., first dataset) provided by the smart car 144 is correct using data (e.g., second dataset) from the smart garage door 142 and/or data (e.g., third dataset) acquired by the sensors 12 of the smart thermostat 46.

When determining the trust value for the first dataset using corroborating information from the second dataset and/or the third dataset, the smart thermostat 46 may determine which dataset corresponds to a ground truth or the dataset associated with the highest trust value and increase or decrease a respective trust value for the first dataset based on how well the first dataset corresponds to the ground truth.

In some instances, more than one dataset may be associated with the ground truth. As such, the smart thermostat 46 may receive data from a number of sensors 12 that are attributed to the ground truth. The smart thermostat 46 may then establish the ground truth (e.g., room is occupied) based on the data from the number of sensors 12. As such, the smart thermostat 46 may establish the trust value based on a heuristic approach that accounts for data received from a number of sensors 12.

In some cases, the smart thermostat 46 may establish a trust value for the first dataset based on how well (e.g., how quickly) the first dataset was received that corroborated data from sensors 12 that established the ground truth. For example, if the first dataset received data that corroborated the data that established the ground truth within some amount of time from which the respective sensor 12 received the data that established the ground truth, the smart thermostat 46 may increase or provide a higher trust value relative to similar data that is not received within the same amount of time. Additionally, trust values may be determined based on an amount of time since the activity or data has been received from a particular sensor 12, a time at which activity or data was received from the particular sensor 12, an amount of time between activity or occupancy detection, and the like.

In one example, the smart thermostat 46 may adjust values or information provided in the first dataset when the trust value is below some threshold. For instance, if the smart thermostat 46 determines that the estimated time until arrival (e.g., first dataset) provided by the smart car 144 described above with regard to FIG. 7 has a trust value that is below some threshold, the smart thermostat 46 may modify the estimated time until arrival it uses to perform its actions.

In addition to determining a trust value based on data received from various sources manufactured by different entities, a smart home device may continuously update the trust value associated with the data received from the various sources, with the devices that provide the data, with the vendor that manufactures the devices, and the like. In one example, the cloud-computing system 64 may track the trust values of data provided by various devices, the devices, and the vendors and share the trust values with a number of smart home devices. As such, the smart home devices may use the aggregate trust values to further identify whether received data sufficiently corroborates other data.

By using data from multiple sources manufactured by different vendors to corroborate data acquired by the multiple sources, the smart home devices may perform justified control actions. That is, the smart devices may use the corroborating data to justify certain actions that it may perform. As such, the smart home devices may act to in a judicious manner to adjust various settings in the smart home environment 30 for the comfort and preferences of their user. Moreover, by employing this justified control scheme in controlling the operations of various smart home devices, the smart home devices may improve its ability to manage their own operations more efficiently.

The specific examples described above have been shown by way of example, and it should be understood that these examples may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A cloud-computing device configured to monitor one or more properties of a home environment, wherein the cloud-computing device is configured to:
   receive a first set of data acquired from a first electronic device configured to monitor at least one of the properties of the home environment;
   receive a second set of data acquired from a second electronic device configured to monitor the at least one of the properties of the home environment, wherein the first electronic device and the second electronic device are manufactured by different vendors;
   receive a third set of data acquired from a third electronic device configured to monitor at least one of the properties of the home environment, wherein the second electronic device and the third electronic device are manufactured by a same vendor; and
   determine a first trust value associated with the first set of data based on a first corroboration of the first set of data and the second set of data, wherein:
      the first trust value indicates a degree to which the first set of data has been determined to be accurate;
      the first corroboration comprises using the second set of data to verify the first set of data;
      the first trust value is incrementally increased and incrementally decreased based on corroboration of additional data obtained from the first electronic device;
   determine a second trust value associated with the third set of data, wherein the second trust value is greater than the first trust value based on the second electronic device and the third electronic device being manufactured by the same vendor; and
   an activity is performed by the second electronic device within the home environment at least partially based on the first trust value.

2. The cloud-computing device of claim 1, wherein the third electronic device is disposed within the home environment and configured to adjust one or more heating, ventilation, and air conditioning properties associated with the home environment based on the first set of data and the first trust value.

3. The cloud-computing device of claim 2, wherein the cloud-computing device is configured to:
   update the first trust value based on a second corroboration of the first set of data using the third set of data.

4. The cloud-computing device of claim 1, wherein the first set of data and the second set of data are associated with an occupancy state of the home environment.

5. The cloud-computing device of claim 1, wherein the cloud-computing device is configured to send commands to one or more devices disposed in the home environment to adjust one or more operations based on the first set of data and the first trust value.

6. An electronic device configured to communicate with a plurality of other electronic devices, wherein the electronic device comprises:
   a network interface configured to:
      receive a first set of data from a first electronic device; and
      receive a second set of data from a second electronic device, wherein the first electronic device and the second electronic device are manufactured by different vendors;
      receive a third set of data acquired from a third electronic device configured to monitor at least one of the property of a smart home environment, wherein the electronic device and the third electronic device are manufactured by a same vendor; and
   a processor configured to:
      determine a first trust value for the first set of data based on a first corroboration of the first set of data using the second set of data, wherein:
         the first trust value indicates a degree to which the first set of data has been determined to be accurate;
         the first corroboration comprises using the second set of data to verify the first set of data; and an activity is performed by the second electronic device within the smart home environment at least partially based on the first trust value;

incrementally increase and incrementally decrease the first trust value based on corroboration of additional data obtained from the first electronic device; and determine a higher trust value for the third set of data as compared to the first set of data and the second set of data because the third electronic device is manufactured by the same vendor as the electronic device.

7. The electronic device of claim 6, wherein a fourth set of data from one or more sensors disposed on the electronic device is collected, and wherein the processor is configured to update the first trust value based on a second corroboration of the first set of data using the fourth set of data, wherein updating the first trust value comprises incrementally increasing or incrementally decreasing the first trust value.

8. The electronic device of claim 7, wherein the first set of data comprises an estimated time until arrival to the smart home environment and the second set of data comprises occupancy information associated with the smart home environment.

9. The electronic device of claim 7, wherein the first electronic device is associated with a vehicle and the second electronic device is associated with a garage door for the smart home environment.

10. The electronic device of claim 6, wherein the processor is configured to send one or more commands to one or more actuators of the electronic device based on the first set of data and the first trust value.

11. The electronic device of claim 10, wherein the commands comprise instructions configured to control one or more operations of one or more devices in the smart home environment.

12. The electronic device of claim 6, wherein the network interface is configured to:

receive a fourth set of data from the first electronic device after determining the first trust value; and receive a fifth set of data from the second electronic device after determining the first trust value;

wherein the processor is configured to determine a third trust value associated with the first electronic device based on the first corroboration and a second corroboration of the fourth set of data based on the fifth set of data.

13. The electronic device of claim 6, wherein: the network interface is configured to receive the first set of data from the first electronic device; and the first electronic device is configured to send the first set of data from outside a building.

14. The electronic device of claim 13, wherein the network interface is configured to receive the second set of data from the second electronic device, wherein the second electronic device is disposed inside the building.

15. A method, comprising:

receiving, via a processor, a first set of data from a first electronic device;

receiving, via the processor, a second set of data from a second electronic device, wherein the first electronic device and the second electronic device are manufactured by different vendors;

receiving, via the processor, a third set of data acquired from a third electronic device, wherein the second electronic device and the third electronic device are manufactured by a same vendor;

determining, via the processor, a first trust value for the first set of data based on a first corroboration of the first set of data with respect to the second set of data, wherein:

the first trust value indicates a degree to which the first set of data has been determined to be accurate; and the first trust value is incrementally increased and incrementally decreased based on corroboration of additional data obtained from the first electronic device;

determining, via the processor, a second trust value associated with the third set of data, wherein the second trust value is greater than the first trust value based on the second electronic device and the third electronic device being manufactured by the same vendor;

generating, via the processor, a modified first set of data based on the first set of data when the first trust value is below a threshold; and sending, via the processor, a command to an actuator based on the modified first set of data, wherein the command to the actuator causes an activity to be performed within a smart home environment.

16. The method of claim 15, comprising:

updating the modified first trust value based on a second corroboration of the first set of data with respect to the third set of data.

17. The method of claim 15, wherein the first corroboration comprises verifying that the first set of data is accurate based on the second set of data, wherein the second set of data is associated with a ground truth, and wherein the second electronic device is associated with a higher trust value than the first electronic device.

18. The method of claim 15, updating, via the processor, an occupancy state of a building based on the first corroboration.

* * * * *